US009069798B2

(12) United States Patent
Hershey et al.

(10) Patent No.: US 9,069,798 B2
(45) Date of Patent: Jun. 30, 2015

(54) METHOD OF TEXT CLASSIFICATION USING DISCRIMINATIVE TOPIC TRANSFORMATION

(75) Inventors: John R. Hershey, Winchester, MA (US); Jonathan Le Roux, Somerville, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 485 days.

(21) Appl. No.: 13/479,656

(22) Filed: May 24, 2012

(65) Prior Publication Data

US 2013/0317804 A1  Nov. 28, 2013

(51) Int. Cl.
*G06F 19/24* (2011.01)
*G06F 17/30* (2006.01)

(52) U.S. Cl.
CPC .............................. *G06F 17/30286* (2013.01)

(58) Field of Classification Search
CPC ............. G06F 17/2785; G06F 17/277; G06F 17/2775; G06F 17/30707; G06F 17/3071; G06F 17/27; G06F 17/28; G06F 17/30705; G06F 17/21; G06F 17/2211; G06F 17/271; G06F 17/30; G06F 17/274; G06F 17/2755; G06F 17/278; G06F 17/279; G06F 17/2795; G06F 17/30731
USPC .................. 704/1–10, 245, 251, 257, 270
See application file for complete search history.

(56) References Cited

U.S. PATENT DOCUMENTS

| | | | |
|---|---|---|---|
| 6,233,575 B1 | 5/2001 | Agrawal et al. | |
| 6,253,169 B1 * | 6/2001 | Apte et al. | 704/9 |
| 6,507,829 B1 * | 1/2003 | Richards et al. | 706/45 |
| 6,751,614 B1 | 6/2004 | Rao | |
| 7,177,796 B1 * | 2/2007 | Damerau et al. | 704/9 |
| 7,529,748 B2 * | 5/2009 | Wen et al. | 1/1 |
| 7,584,100 B2 * | 9/2009 | Zhang et al. | 704/245 |
| 7,769,751 B1 * | 8/2010 | Wu et al. | 707/728 |
| 8,041,669 B2 * | 10/2011 | Nigam et al. | 706/55 |
| 8,239,397 B2 * | 8/2012 | Stefik et al. | 707/758 |

(Continued)

FOREIGN PATENT DOCUMENTS

WO   WO 03/014975   *  2/2003   ............... G06F 7/00

OTHER PUBLICATIONS

Chen et al., "Diverse Topic Phrase Extraction through Latent Semantic Analysis", Proceedings of the Sixth International Conference on Data Mining, IEEE, 2006, pp. 1-5.*

(Continued)

*Primary Examiner* — Abdelali Serrou
(74) *Attorney, Agent, or Firm* — Dirk Brinkman; Gene Vinokur

(57) ABSTRACT

Text is classified by determining text features from the text, and transforming the text features to topic features. Scores are determined for each topic features using a discriminative topic model. The model includes a classifier that operates on the topic features, wherein the topic features are determined by the transformation from the text features, and the transformation is optimized to maximize the scores of a correct class relative to the scores of incorrect classes. Then, a class label with a highest score is selected for the text. In situations where the classes are organized in a hierarchical structure, the discriminative topic models apply to classes at each level conditioned on previous levels and scores are combined across levels to evaluate the highest scoring class labels.

16 Claims, 2 Drawing Sheets

(56) References Cited

U.S. PATENT DOCUMENTS

| | | | |
|---|---|---|---|
| 8,527,523 B1* | 9/2013 | Ravid | 707/749 |
| 2002/0087520 A1* | 7/2002 | Meyers | 707/3 |
| 2003/0220922 A1* | 11/2003 | Yamamoto et al. | 707/7 |
| 2005/0165607 A1 | 7/2005 | Di Fabbrizio et al. | |
| 2006/0026152 A1* | 2/2006 | Zeng et al. | 707/5 |
| 2006/0095521 A1* | 5/2006 | Patinkin | 709/206 |
| 2009/0100053 A1* | 4/2009 | Boschee et al. | 707/6 |
| 2009/0204703 A1* | 8/2009 | Garofalakis et al. | 709/224 |
| 2009/0234688 A1* | 9/2009 | Masuyama et al. | 705/7 |
| 2011/0004463 A1* | 1/2011 | Gryc et al. | 704/9 |
| 2011/0082688 A1 | 4/2011 | Kim et al. | |
| 2011/0252045 A1* | 10/2011 | Garg et al. | 707/750 |
| 2011/0258229 A1* | 10/2011 | Ni et al. | 707/776 |
| 2011/0307252 A1 | 12/2011 | Ju et al. | |
| 2012/0179634 A1* | 7/2012 | Chen et al. | 706/12 |
| 2012/0296637 A1* | 11/2012 | Smiley et al. | 704/9 |
| 2012/0330958 A1* | 12/2012 | Xu et al. | 707/738 |
| 2013/0138641 A1* | 5/2013 | Korolev et al. | 707/730 |

OTHER PUBLICATIONS

Lewis, D., "Feature Selection and Feature Extraction for Text Categorization", Speech and Natural Language: Proceedings of a Workshop Held at Harriman, New York pp. 212-217 (Feb. 1992).*

Apte, C. et al., "Automated Learning of Decision Rules for Text Categorization", IBM Research Report RC 18879. To Appear in ACM Transactions on Information Systems, pp. 1-20 (no date).; vol. 12, Issue 3, accepted Mar. 1994.*

Yang, Y. et al., "A Comparative Study on Feature Selection in Text Categorization", International Conference on Machine Learning, pp. 412-420 (Jul. 1997).*

Basu, Sugato et al., "Semi-Supervised Clustering by Seeding," Proceedings of the 19th Internaitonal Conference on Machine Learning (ICML-2002), Sydney, Australia, Jul. 2002 (ages 19-26,).*

W. W. Cohen, "Improving a Page Classifier with Anchor Extraction and Link Analysis", Neural Information Processing Systems Foundation, 2002.*

Bryant et al., "Recognizing Intentions in Infant-Directed Speech: Evidence for Universals," Universals in Infant-Directed Speech: Nov. 2006—in press, Psychological Science.

So-Jeong Youn et al., "Intention Recognition Using a Graph Representation," World Academy of Science, Engineering and Technology 25, 2007, p. 13-18.

Chakrabarti et al. "Scalable Feature Selection, Classification and signature generation for organizing large text databases into hierarchical topic taxonomies," VLDB Journal, Springer Verlag, Nerlin, DE. vol. 7, No. 3. Aug. 1, 1998.

Hofmann et al. "Intention-Based Probabilistic Phrase Spotting for Speech Understanding," Proc. of the Int. Symp. on Intelligent Multimedia, Video and Speech Processing, ISIMP 2001, Hong Kong.

D. Blei, J. McAuliffe. "Supervised topic models." Neural Information Processing Systems 21, 2007.

Seungil Huh et al., "Discriminative Topic Modeling Based on Manifold Learning," Proceeding KDD '10 Proceedings iof the 16th ACM SIGKDD International Conference on Kowledge Discovery and Data Mining. pp. 653-662. Jul. 28, 2010.

S. Lacoste-Julien et al. "DiscLDA: Discriminative learning for dimensionality reduction and classification." Advances in Neural Information Processing Systems (NIPS) 21, 2009.

* cited by examiner

METHOD OF TEXT CLASSIFICATION USING DISCRIMINATIVE TOPIC TRANSFORMATION

FIELD OF THE INVENTION

This invention is related generally to a method for classifying text, and more particularly to classifying the text for a large number of categories.

BACKGROUND OF THE INVENTION

Text classification is an important problem for many tasks in natural language processing, such as user-interfaces for command and control. In such methods, training data derived from a number of classes of text are used to optimize parameters used by a method for estimating a most likely class for the text.

Multinomial Logistic Regression (MLR) Classifiers for Text Classification.

Text classification estimates a classy from an input text x, where y is a label of the class. The text can be derived from a speech signal.

In prior art multinomial logistic regression, information about the input text is encoded using a feature function $$f_{j,k}:(x,y) \mapsto \{0,1\},$$

typically defined such that $$f_{j,k}(x, y) = \begin{cases} 1 & t_j \in x \text{ and } y = I_k \\ 0 & \text{otherwise,} \end{cases}$$

In other words, the feature is 1 if a term $t_j$ is contained in the text x, the class label y is equal to category $I_k$.

A model used for the classification is a conditional exponential model of the form $$p_\Lambda(y|x) = \frac{1}{Z_\Lambda(x)} e^{\sum_{j,k} \lambda_{j,k} f_{j,k}(x,y)},$$

where $$Z_\Lambda(x) = \sum_y e^{\sum_{j,k} \lambda_{j,k} f_{j,k}(x,y)}.$$

and $\lambda_{j,k}$ and $\Lambda$ are the classification parameters.

The parameters are optimized on training pairs of texts $x_i$ and labels $y_i$, using an objective function $$L_\Lambda = \sum_{i,j,k} \lambda_{j,k} f_{j,k}(x_i, y_i) - \log \sum_{y'} e^{\sum_{j,k} \lambda_{j,k} f_{j,k}(x_i, y')},$$

which is to be maximized with respect to $\Lambda$.

Regularized Multinomial Logistic Regression Classifiers

Regularization terms can be added to classification parameters in logistic regression to improve a generalization capability.

In regularized multinomial logistic regression classifiers, a general formulation using both the L1-norm and the L2-norm regularizers is $$L_\Lambda = \sum_{i,j,k} \lambda_{j,k} f_{j,k}(x_i, y_i) - \log \sum_{y'} e^{\sum_{j,k} \lambda_{j,k} f_{j,k}(x_i, y')} - \alpha \sum_{j,k} |\lambda_{j,k}|^2 - \beta \sum_{j,k} |\lambda_{j,k}|,$$

where $$\alpha \sum_{j,k} |\lambda_{j,k}|^2$$

is the L2-norm regularizer, and $$\beta \sum_{j,k} |\lambda_{j,k}|$$

is an L1-norm regularizer, and $\alpha$ and $\beta$ are weighting factors. This objective function is again to be maximized with respect to $\Lambda$.

Various methods can optimize the parameters under these regularizations.

Topic Modeling

In prior art, probabilistic latent semantic analysis (PLSA) and latent Dirichlet analysis (LDA) are generative topic models in which topics are multinomial latent variables, and the distribution of topics depends on particular document including the text where the words are distributed multinomially given the topics. If the documents are associated with classes, then such models can be used for text classification.

However with generative topic models, the class-specific parameters and the topic-specific parameters are additive according to a logarithmic probability.

SUMMARY OF THE INVENTION

The embodiments of the invention provide a method for classifying text using discriminative topic transformations. The embodiments of the invention also performs classification in problems where the classes are arranged in a hierarchy.

The method extracts features from text, and then transforms the features into topic features, before classifying text to determine scores.

Specifically, the text is classified by determining text features from the text, and transforming the text feature to topic features. The text can be obtained from recognized speech.

Scores are determined for each topic features using a discrcrimative topic transformation model.

The model includes a classifier that operates on the topic features, wherein the topic features are determined by the transformation from the text features, and the transformation is optimized to maximize the scores of a correct class relative to the scores of incorrect classes.

Then, a set of class labels with highest scores is selected for the text. The number of labels selected can be predetermined, or dynamic.

In situations where the classes are organized in a hierarchical structure, where each class corresponds to a node in the hierarchy, the method proceeds as follows. The hierarchy can be traversed in a breadth-first order.

The first stage of the method is to evaluate the class scores of the input text at the highest level of the hierarchy (level one) using a discriminative topic transformation model trained for the level-one classes in the same way as described above.

Scores for each level-one class are produced by this stage and are used to select a set of level-one classes having the greatest scores. For each of the selected level-one classes, the corresponding level-two child classes are then evaluated using a discriminative topic transformation model associated with each level-one class. The procedure repeats for one or more levels, or until the last level of the hierarchy is reached. Scores from each classifier used on the path from the top level to any node of the hierarchy are combined to yield a joint score for the classification at the level of that node. The scores are used to output the highest scoring candidates at any given level in the hierarchy. The topic transformation parameters in the discriminative topic transformation models can be shared among one or more subsets of the models, in order to promote generalization within the hierarchy.

DETAILED DESCRIPTION OF THE PREFERRED EMBODIMENTS

Figure 1:
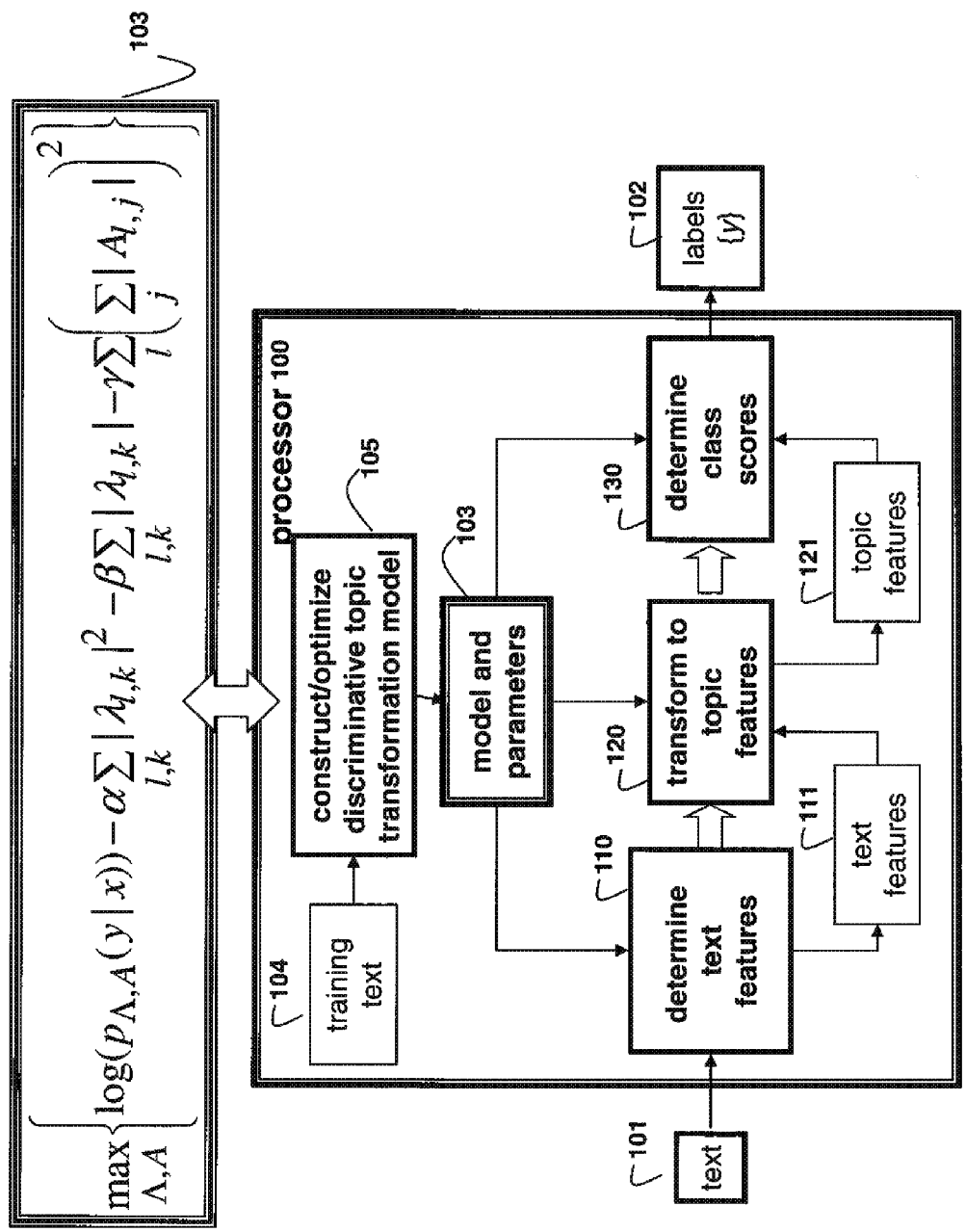
FIG. 1 is a flow diagram of a text classification method and system according to embodiments of the invention.

The embodiments of the invention provide a method for classifying text using discriminative topic transformation model.

The method extracts text features $f_{j,k}(x,y)$ from the text to be classified, where j is an index for a type of feature, k is an index of a class associated with the feature, x is the text, and y is a hypothesis of the class.

The text features are transformed to topic features using $$g_{l,k}(x,y) = h_l(f_{1,k}(x,y), \ldots, f_{J,k}(x,y)),$$

where $h_l(\cdot)$ is a function that transforms the text features, and l is an index of the topic features.

The term "topic features" is used because the features are related to semantic aspects of the text. As used in the art and herein, "semantics" relate to the meaning of the text in a natural language as a whole. Semantics focuses on a relation between signifiers, such as words, phrases, signs and symbols, and what the signifiers denote. Semantics is distinguished from the "dictionary" meaning of the individual words.

A linear transform, $$h_l(f_{1,k}(x,y), \ldots, f_{J,k}(x,y)) = \Sigma_j A_{l,j} f_{j,k}(x,y),$$

parameterized by a feature transformation matrix A, produces the topic features $$g_{l,k}(x, y) = \sum_j A_{l,j} f_{j,k}(x, y).$$

Then, our discriminative topic transformation model is $$p_{\Lambda,A}(y \mid x) = \frac{1}{Z_{\Lambda,A}(x)} e^{\sum_{l,j,k} \lambda_{l,k} A_{l,j} f_{j,k}(x,y)},$$

where $$Z_{\Lambda,A}(x) = \sum_y e^{\sum_{l,j,k} \lambda_{l,k} A_{l,j} f_{j,k}(x,y)}.$$

We construct and optimize our model using training text. The model includes the set classification parameters $\Lambda$ and and the feature transformation matrix A. The parameters maximize the scores of the correct class labels. The model is also used to evaluate the scores during classification. The construction can be done in a one time preprocessing step.

The model parameters can also be regularized during optimization using various regularizers designed for the feature transformation matrix A, and the classification parameters $\Lambda$.

One way uses a mixture of $$L2\alpha \sum_{j,k} |\lambda_{j,k}|^2, L1\beta \sum_{j,k} |\lambda_{j,k}|$$

regularizers on the classification parameters $\Lambda$, and a combined L1/L2 regularizer $$\gamma \sum_l \left( \sum_j |A_{l,j}| \right)^2$$

on the feature transformation matrix A matrix, where $\alpha$, $\beta$, and $\gamma$ are weighting factors.

Objective Function for Training Model Parameters

Then, the objective function for training model parameters $\Lambda$ and A on training pairs of texts $x_i$ and labels $y_i$ is $$L_{\Lambda,A} = \sum_i \log(p_{\Lambda,A}(y_i \mid x_i)) - \alpha \sum_{l,k} |\lambda_{l,k}|^2 - \beta \sum_{l,k} |\lambda_{l,k}| - \gamma \sum_l \left( \sum_j |A_{l,j}| \right)^2,$$

where $\alpha$, $\beta$, $\gamma$ are the weights controlling a relative strength of each regularizer, which are determined using cross-validation. This objective function is to be maximized with respect to $\Lambda$ and A.

Scoring

Scores for each classy given text x can be computed using a similar formula as used in the objective function above, leaving out the constant terms:

$$s_{\Lambda,A}(y \mid x) = \sum_{l,j,k} \lambda_{l,k} A_{l,j} f_{j,k}(x, y).$$

Hierarchical Classification

We now consider the case where the classes are organized in a hierarchical structure. For each text x, we now have labels $y^d$, $d=1, \ldots, D$ for each level of the hierarchy. The label variable $y^d$ at each level d takes values in a set $C^d$. The set of considered values for $y^d$ can be restricted to a subset $C^d(y^{1:(d-1)})$ according to the values taken by the label variables $y^{1:(d-1)} = y^1, \ldots, y^{d-1}$ at previous levels.

For example, in the case of a tree structure for the classes, each set $C^d(y^{1:(d-1)})$ can be defined as the set of children of the label $y^{d-1}$ at level d−1.

For estimating the class at each level d, we can construct classifiers for the text that depend on the hypothesis of the classes at the previous levels d'≤d−1. The score for class $y^d$ is computed using the following formula:

$$s_{\Lambda^d(y^{1:(d-1)}), A}(y^d|x, y^{1:(d-1)}) = \sum_{l,j,k} \lambda_{l,k}^d(y^{1:(d-1)}) A_{l,j} f_{j,k}(x, y^d),$$

where $\Lambda^d(y^{1:(d-1)})$ is the set of parameters for classes at level d given the classes at level 1 to d−1. Optionally, the matrix A can depend on the level d and previous levels' classes $y^{1:(d-1)}$, but there may be advantages to having it shared across levels.

In the case of a tree representation, one possibility is to simplify the above formula to $$s_{\Lambda^d(y^{d-1}), A}(y^d|x, y^{d-1}) = \sum_{l,j,k} \lambda_{l,k}^d(y^{d-1}) A_{l,j} f_{j,k}(x, y^d),$$

so that scoring only depends on the class of the previous level.

In this framework, inference can be performed by traversing the hierarchy, and combining scores across levels for combinations of hypotheses $y^{1:d}$.

Combining the scores across levels can be done in many ways. Here, we shall consider summing over scores from different levels:

$$s(y^{1:d}|x) = \sum_{d' \leq d} s_{\Lambda^{d'}(y^{1:(d'-1)}), A}(y^{d'}|x, y^{1:(d'-1)})$$

In some contexts, it can be important to determine the marginal score $s(y^d|x)$ of $y^d$. In the case of conditional exponential models, this is given (up to an irrelevant constant) by $$s(y^d|x) = \log\left(\sum_{y^{1:(d-1)}} \exp(s(y^{1:d}|x))\right).$$

In the case of a tree, we simply have $s(y^d|x)=s(y^{1:d}|x)$ as there is only a single path that leads to $y^d$.

The combined scores for different hypotheses are used to rank the hypotheses and determine the most likely classes at each level for the input text.

Traversing the hierarchy can also be done in many ways, we traverse the hierarchy from the top in a breadth-first search strategy. In this context, we can speed up the process by eliminating from consideration hypotheses $y^{1:(d-1)}$ up to level d−1 whose scores are too low. At level d, we now only have to consider hypotheses $y^{1:d}$ that include the top scoring $y^{1:(d-1)}$.

The hierarchy can also be represented by a directed acyclic graph (DAG). The DAG has no cycles. An undirected graph can be converted into a DAG by choosing a total ordering of the nodes of the undirected graph, and orienting every edge between two nodes from the node earlier in the order to the node later in the order.

Method

FIG. 1 shows a method for classifying text using discriminative topic transformation models according to embodiments of our invention.

As described above, we construct 105 our model 103 from known labeled training text 104 during preprocessing.

After the model is constructed, unknown unlabeled text can be classified.

Input to the method is text 101, where the text includes glyphs, characters, symbols, words, phrases, or sentences. The text can be derived from speech.

Output is a set of class labels 102 that most likely correspond to the unknown input text, i.e., class hypotheses.

Using the model, text features 111 are determined 110 from the input text 101. The text features are transformed 120 to topic features 121.

Class scores are determined 130 according to the model 103. Then, the set of class labels 102 with the highest scores is produced.

The steps of the above methods can be performed in a processor 100 connected to memory and input/output interfaces as known in the art.

Figure 2:
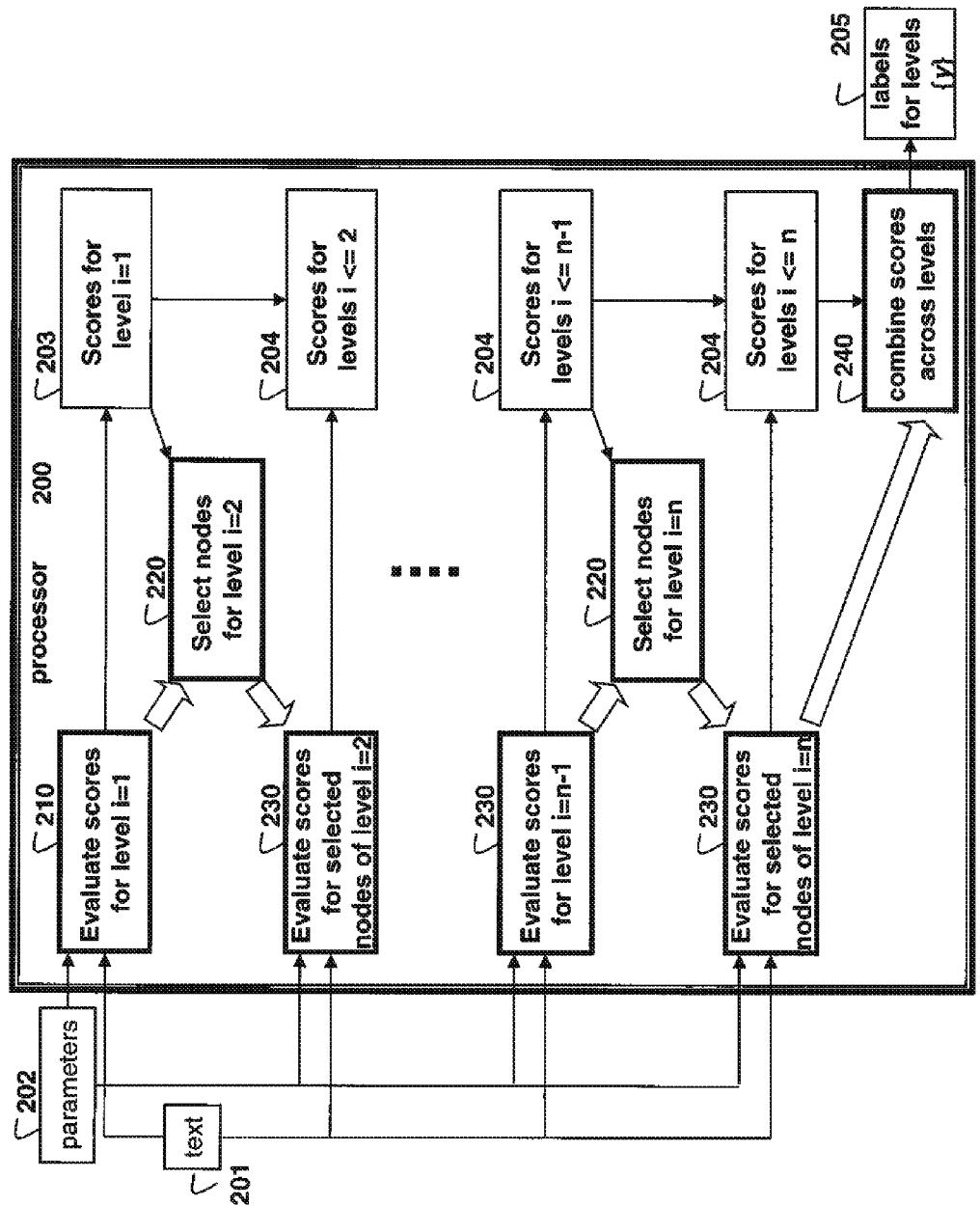
FIG. 2 is a flow diagram of a hierarchical text classification method and system according to embodiments of the invention.

FIG. 2 shows a method for classifying text using the above method in the case where the classes are arranged in a tree-structured hierarchy.

Parameters 202 are constructed according to the above method for performing classification at each level of the hierarchy. Scores for level 1 classes are evaluated 210 on unlabeled text 201 as above, producing scores for level 1 classes 203. One or more nodes in the next level 2 are then selected 220 based on the scores for level 1. Scores for selected nodes for level 2 are again evaluated 230 using the above method on unlabeled text 201, and are aggregated 204 with scores for the previous level.

The same method is performed at each subsequent level of the hierarchy, beginning with selection 220 of nodes for the level i, evaluation 230 of scores at level i, and storage of the scores up to level i 204.

After the scores up to the final level i=n have been aggregated, the scores are combined 240 across levels, and the set 205 of class labels for each level with the highest scores is produced.

EFFECT OF THE INVENTION

The invention provides an alternative to conventional text classification methods. Conventional methods can use features based on topic models. However, those features are not discriminatively trained within a framework of the classifier.

The use of topic features allows parameters to be shared among all classes, which enables the model to determine relationships between words across the classes, in contrast to only within each class, as in conventional classification models.

The topic features also allow the parameters for each class to be used for all classes, which can reduce noise and overfitting during the parameter estimation, and improve generalization.

Relative to latent variable topic models, our model involves multiplication of the topic-specific and class-specific parameters in the log probability domain, whereas the prior art latent variable topic models involve addition in the log probability domain, which yields a different set of possible models.

As another advantage, our method uses a multivariate logistic function with optimization that is less sensitive to the training texts points that are far from a decision boundary.

The hierarchical operation of the classification combined with the discriminative topic transformations, enables the system to generalize well from training data by sharing parameters among classes. It also enables to back off to higher level classes if inference at lower levels cannot be performed with sufficient confidence.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for classifying text, comprising-steps of:
   acquiring text as input data in a processor, wherein the text is derived from one or more hypotheses from an automatic speech recognition system operating on a speech signal;
   determining text features from the text x, wherein the text features are $f_{j,k}(x,y)$;
   transforming the text features to topic features, wherein the transforming is according to $g_{l,k}(x,y)=h_l(f_{1,k}(x,y),\ldots,f_{J,k}(x,y))$, where j is an index for a type of feature, k is an index of a class associated with the feature, y is a hypothesis of the class label, and $h_l(\bullet)$ is a function that transforms the text features, and l is an index of the topic features;
   determining scores from the topic features, wherein the determining steps use a model, wherein the model is a discriminative topic model comprising a classifier operating on the topic features, and the transforming is optimized to maximize the scores of a correct class relative to the scores of incorrect classes, wherein the discriminative topic model is $$\max_{\Lambda,A}\left\{\log(p_{\Lambda,A}(y\mid x)) - \alpha\sum_{l,k}|\lambda_{l,k}|^2 - \beta\sum_{l,k}|\lambda_{l,k}| - \gamma\sum_l\left(\sum_j|A_{l,j}|\right)^2\right\}$$

where $\alpha, \beta, \gamma$ are weight, and $\Lambda$ is a classification optimizing parameter;
   selecting a set of class labels with highest scores for the text;
   outputting the set of class labels to classify the text, wherein the steps are performed in the processor.

2. The method of claim 1, wherein the topic features are a linear transformation of the text features.

3. The method of claim 1, wherein parameters of the model are regularized using regularizers comprising L1-norm, L2-norm, and mixed-norm regularizers.

4. The method of claim 1, wherein the topic features relate to semantic aspects of the text.

5. The method of claim 1, wherein a linear transform $$h_l(f_{1,k}(x,y),\ldots,f_{J,k}(x,y))=\Sigma_j A_{l,j}f_{j,k}(x,y)$$

is parameterized by a feature transformation matrix A to produces the topic features $$g_{l,k}(x,y) = \sum_j A_{l,j}f_{j,k}(x,y).$$

6. The method of claim 1, wherein the weights are determined by cross-validation.

7. The method of claim 1, wherein the classifying is according to semantics of a natural language used by the text.

8. The method of claim 1, wherein the classes are organized in a hierarchical structure, wherein each class corresponds to a node in the hierarchy, wherein nodes are assigned to different levels of the hierarchy, wherein different classification parameters are used for one or more of the levels of the hierarchy, wherein classification is performed by traversing the hierarchy to evaluate partial scores of the classes at each level conditioned on hypotheses of the classes at previous levels, and combining the partial scores of the classes at one or more of the levels to determine a joint score.

9. The method of claim 8, wherein the hierarchy is represented as a tree.

10. The method of claim 8, wherein the hierarchy is represented as a directed acyclic graph.

11. The method of claim 8, wherein the hierarchy is traversed in a breadth-first manner.

12. The method of claim 8, wherein the scores at one or more levels are used to eliminate hypotheses from consideration at other levels.

13. The method of claim 12, wherein at a given level all but the highest scoring hypotheses are eliminated from further consideration.

14. The method of claim 12, wherein at a given level all but n highest scoring hypotheses are eliminated from further consideration, for some positive integer n.

15. The method of claim 8, wherein the joint score of a sequence of classes along a path from a top level to a class at another level is determined by summing the partial scores along the path.

16. The method of claim 15, wherein the score of the class at a particular level is determined by marginalizing the joint scores of all paths leading to the class.

* * * * *